United States Patent [19]
Eccles

[11] Patent Number: 5,840,191
[45] Date of Patent: Nov. 24, 1998

[54] PROCESS FOR THE TREATMENT OF CONTAMINATED MATERIAL

[75] Inventor: Harry Eccles, Preston, United Kingdom

[73] Assignee: British Nuclear Fuels plc, Warrington, England

[21] Appl. No.: 693,266

[22] PCT Filed: Feb. 13, 1995

[86] PCT No.: PCT/GB95/00287

§ 371 Date: Oct. 3, 1996

§ 102(e) Date: Oct. 3, 1996

[87] PCT Pub. No.: WO95/22375

PCT Pub. Date: Aug. 24, 1995

[30]  Foreign Application Priority Data

Feb. 16, 1994 [GB] United Kingdom .................... 9402975
Jul. 16, 1994 [GB] United Kingdom .................... 9414425

[51] Int. Cl.⁶ ........................................................ C02F 3/30
[52] U.S. Cl. .......................... 210/601; 210/610; 210/631; 210/717; 210/719; 210/724; 210/747; 210/909; 210/912; 405/128; 435/262.5
[58] Field of Search ............................. 405/128; 210/601, 210/610, 631, 702, 717, 719, 724, 747, 909, 912, 630; 435/262.5

[56]  References Cited

U.S. PATENT DOCUMENTS

| | | | |
|---|---|---|---|
| 4,108,722 | 8/1978 | Stover | 195/1 |
| 4,155,982 | 5/1979 | Hunkin et al. | 423/7 |
| 4,200,523 | 4/1980 | Balmat | 210/4 |
| 4,354,937 | 10/1982 | Hallberg | 210/607 |
| 4,354,942 | 10/1982 | Kaczur et al. | 210/712 |
| 4,376,098 | 3/1983 | Yan | 423/20 |
| 4,401,569 | 8/1983 | Jhaveri et al. | 210/610 |
| 4,522,723 | 6/1985 | Kauffman et al. | 210/611 |
| 4,789,478 | 12/1988 | Revis et al. | 210/611 |
| 5,076,927 | 12/1991 | Hunter | 210/603 |
| 5,155,042 | 10/1992 | Lupton et al. | 435/262.5 |
| 5,202,033 | 4/1993 | Stanforth et al. | 210/747 |
| 5,217,615 | 6/1993 | Tyagi et al. | 210/912 |
| 5,250,102 | 10/1993 | Barnes et al. | 75/710 |
| 5,263,795 | 11/1993 | Corey et al. | 405/128 |
| 5,316,751 | 5/1994 | Kingsley et al. | 435/262.5 |
| 5,324,433 | 6/1994 | Grant et al. | 210/634 |
| 5,348,662 | 9/1994 | Yen et al. | 210/717 |
| 5,431,825 | 7/1995 | Diel | 210/719 |
| 5,449,397 | 9/1995 | Hunter et al. | 75/744 |

FOREIGN PATENT DOCUMENTS

| | | |
|---|---|---|
| 0436254 | 7/1991 | European Pat. Off. . |
| 2651673 | 2/1980 | Germany . |
| 3300402 | 10/1984 | Germany . |
| 249155 | 9/1987 | Germany . |
| 290408 | 5/1991 | Germany . |
| 4117515 | 12/1992 | Germany . |
| 64-67299 | 3/1989 | Japan . |
| wo 94/03403 | 2/1994 | WIPO . |

*Primary Examiner*—Jay H. Woo
*Assistant Examiner*—Betsey J. Morrison
*Attorney, Agent, or Firm*—Sheridan Ross P.C.

[57]  ABSTRACT

A process for the decontamination of a medium including a particulate material contaminated with one or more organic species and one or more metal species, the process including the steps of: (1) treating said medium by breaking down the organic species by or through the action of microbial agents, (2) treating the medium with microbially produced sulfuric acid so as to solubilize and leach the metal species as a metal sulfate, (3) treating the leached metal sulfate by a bioprecipitation process which converts the said sulfate into one or more insoluble metal sulfides and hydrogen sulfide, (4) separating the hydrogen sulfide from the one or more insoluble metal sulfides and (5) oxidizing the separated hydrogen sulfide to form a reusable source of a sulfur-containing ingredient.

14 Claims, 1 Drawing Sheet

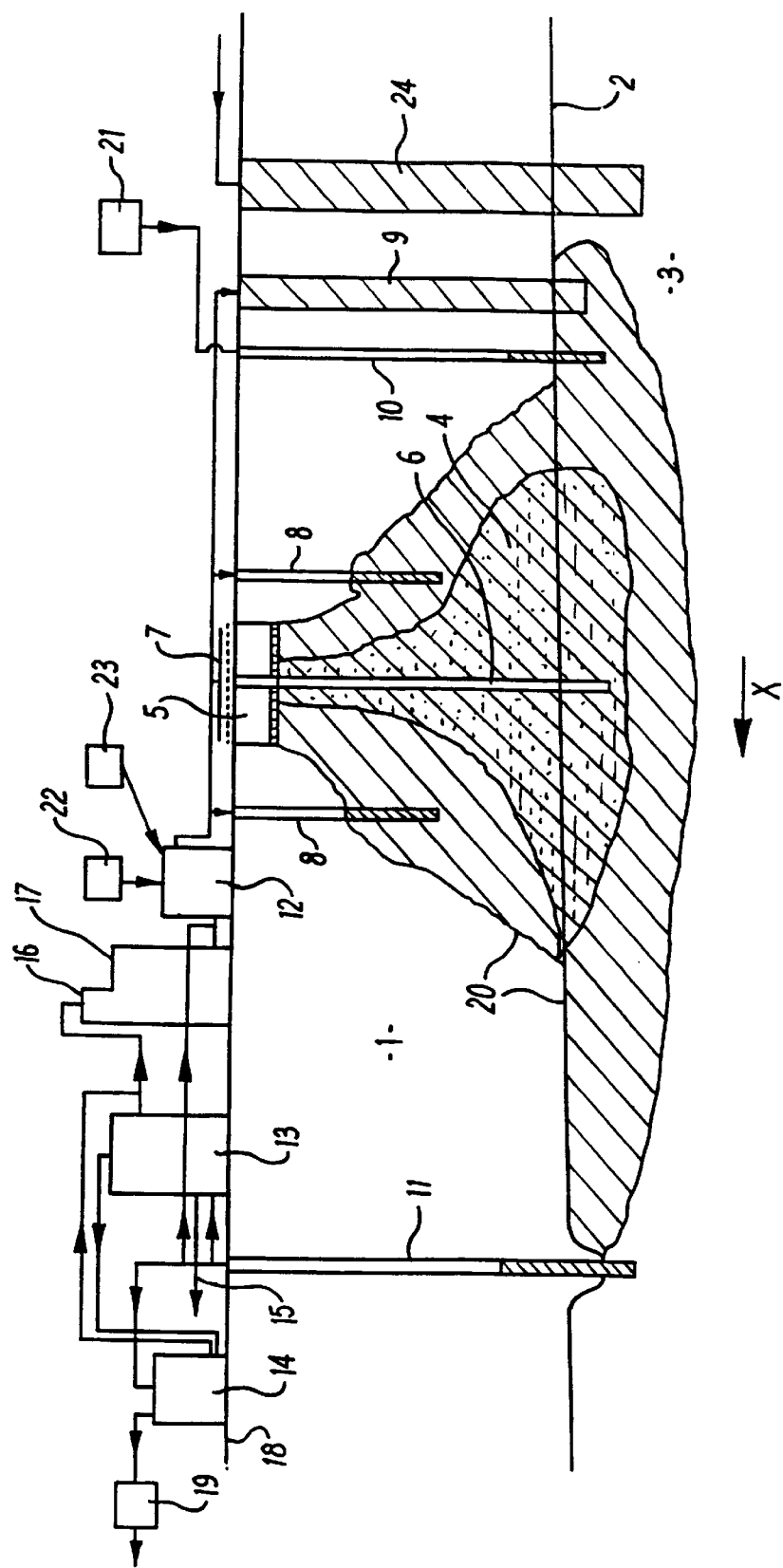

PROCESS FOR THE TREATMENT OF CONTAMINATED MATERIAL

FIELD OF THE INVENTION

The present invention relates to a process for the treatment of contaminated material, in particular a process for the treatment of organic and metal, especially heavy metal, contaminants in bulk particulate material such as land or soil using biochemical processes.

BACKGROUND OF THE INVENTION

World-wide, substantial amounts of land have been contaminated with both organic and inorganic substances as a result of industrial, waste disposal and other activities. Examples of such contaminants include: toxic heavy metals including mercury, cadmium, barium and lead, radionuclides such as actinides and fission products and organic pollutants such as btex (benzene, toluene, ethylbenzene and xylene), PAHs (polyaromatic hydrocarbons), polychlorinated biphenyls (PCBs) and dioxins. Such contaminants can pose a significant threat to ground water and therefore drinking water supplies and in many cases either limit, or prevent land re-use. Additionally, as a result of recent legislation in the United States of America and likely similar legislation within the European Community and elsewhere, waste producers are becoming increasingly liable to prosecution and to meet the costs of recovery and clean up if they do not act responsibly towards their wastes. Consequently there is a growing need for technologies which can solve the problem of contaminated land.

To date, a number of techniques have been developed to remediate contaminated land. Examples include: soil stabilization, electromigration, vitrification, volatilization, incineration, soil washing, pump and treat systems, land farming, slurry phase bioremediation etc. Many of these known techniques possess several limitations including:

a) Lack of a permanent solution to the problem, e.g. transferral of the material to a toxic landfill, or entrapment within matrixes possessing a limited life;

b) Unsuitability to treat a wide range of contaminants, e.g. metal contaminated land in the case of current biological processes;

c) The generation of high volume, or difficult to control secondary wastes, e.g. soil stabilization and incineration;

d) Lack of selectivity of in-situ or ex-situ options as appropriate to a particular site, e.g. as in the case of incineration or soil washing;

e) High costs, e.g. incineration, vitrification and pump and treat systems;

f) Limited ability to re-use contaminants, e.g. soil stabilization systems when applied to metals.

SUMMARY OF THE PRESENT INVENTION

The present invention seeks to address these problems by enabling biological systems to remediate metal and organic contaminated media such as land non-specifically.

According to the present invention a process for the decontamination of a medium comprising a material contaminated with one or more organic species and one or more metal species comprises the steps of treating a body of the said medium by a process which breaks down the organic contaminant(s) by or through the action of microbial agents followed by treating the same body with microbially produced sulfuric acid so as to solubilize and leach the metal species as a metal sulfate; and treating the leached metal sulfate by a bioprecipitation process which converts the said sulfate to one or more insoluble metal sulfides. Desirably, the process also includes the following steps:

a) the separation of hydrogen sulfide from the insoluble metal sulfides.

b) the subsequent oxidation of the separated hydrogen sulfide to form a reusable source of sulfur containing ingredient.

In the said process organic contaminants may also be broken down by the action of microbially produced sulfuric acid in the second (metal species removal) stage of the process.

In the first or organic degradation stage of the process the pH of the medium being treated is desirably in the range 4 to 9. The micro-organisms which break down the organic compounds may be present in the said medium as naturally occurring species, e.g. as bacteria present in soil, or cultures of them may be added to the said medium. In either case, nutrients are desirably fed to promote the activity of the appropriate species. The microbial consortia employed will depend upon the type of organic contaminant present, which may be determined by prior analysis of the said medium, and the nutrients will be selected accordingly. The enrichment of the medium by addition of different types of micro-organism to break down the organic contaminants present is described further below.

The organic contaminants may comprise, for example, benzene, toluene, other aromatic compounds, PAHs or any of the other common organic contaminants referred to above.

The medium to be decontaminated may comprise a particulate material such as soil, rock particles, dredgings, sediments, sludges, process residues, slags from pyrolytic processes, furnace dusts and the like. The contaminants may be contained on the surface of the particulate material or may be bound inside the particles thereof.

Several metal species may be present in the said medium and these may be converted to various metal sulfates and subsequently bioprecipitated as various metal sulfides. The term "metal species" as used herein includes metals, alloys, metal salts, metalloids and metal containing compounds and complexes.

The said metal species contaminants may include:

i) actinides or their radioactive decay products or compounds thereof;

ii) fission products;

iii) heavy metals or compounds thereof.

Actinides are elements having periodic numbers in the inclusive range 89 to 104.

The term 'fission product' as used herein refers to those elements formed as direct products (or so-called 'fission fragments') in the fission of nuclear fuel and products formed from such direct products by beta decay or internal transitions. Fission products include elements in the range from selenium to cerium in the Periodic Table.

Non-radioactive heavy metals desired to be separated by the process of the present invention include toxic metals such as nickel, zinc, cadmium, copper, mercury and cobalt. These are commonly found as earth contaminants or in aquatic sediments near industrial plants which have employed chemicals containing these elements and on waste disposal sites. The metallic contaminants separated by the process of the present invention may include a mixture of radioactive and non-radioactive metallic contaminants.

The particulate material desirably is treated by leaching with the biologically produced sulfuric acid using an aqueous leachant solution.

Where the medium to be decontaminated comprises soil or land, this may be treated in-situ or ex-situ. In the latter case the soil may be pre-treated e.g. to remove or crush large objects e.g. boulders, stones and the like. A suitable mixture of an aqueous solution containing biologically produced sulfuric acid and/or a source of sulfurous material bioconvertible into sulfuric acid may be injected into or mixed with the soil. Other ingredients such as nitrogen-rich or phosphorus-rich materials and air may optionally be added. The bioconversion may be carried out in a known way by microbial agents present in the soil. The sulfurous material may comprise either elemental sulfur or another reduced form of sulfur. Some addition of nutrients may be required to promote the microbial action necessary for organics degradation. The precise nature of these additions will be site specific and selected accordingly.

Where the soil or other particulate material, e.g. process residues or slag, is to be treated ex-situ it may be treated in one or more suitable known reactors. The aforementioned ingredients may be added to promote organics removal and acid production.

Where the bioconversion to produce sulfate ions is carried out in the soil to be treated it may be brought about by the action of naturally occurring sulfur oxidizing organisms including: *Thiobacillus ferooxidans, Thiobacillus thiooxidans* and *Thiobacillus neapolitanus*. These organisms obtain the energy necessary for their growth by the oxidation of reduced forms of sulfur thereby producing sulfates and sulfuric acid, or by the oxidation of ferrous iron to ferric iron.

If the soil is deficient in appropriate micro-organisms, or if the particulate material is to be treated in a separate bioreactor then these micro-organisms may be added as a mixed consortium obtained from similar soil environments.

In addition to acid leaching mentioned above metal release can occur by one or more of the following mechanisms:

a) direct attack of metal sulfides;

b) by electrochemical processes (galvanic conversion), resulting from contact between two dissimilar metal species immersed in a suitable electrolyte, e.g. sulfuric acid; or c) by the oxidative effect of ferric sulfate.

As an alternative to in-situ biological acid production, the sulfuric acid required for the leaching process may be produced chemically or biochemically in a separate bioreactor and added to the soil or other particulate material after production.

During process start up, elemental sulfur, or sulfuric acid (bypassing in-situ biological acid production), may be used as the acid source for leaching. Thereafter, elemental sulfur or a combination of elemental sulfur and sulfuric acid may be the major acid source. Elemental sulfur, or sulfuric acid may be added to replace the available sulfur lost from the system, as metal sulfides.

The leachate solution may be allowed to percolate through and drain from the body of particulate material. The leachate solution so collected may then either be recirculated through the particulate material or be pumped into a reactor to carry out the bioprecipitation process.

The bioprecipitation step in the process of the present invention may be a known step per se which may employ a naturally occurring consortium of disimulatory sulfate reducing bacteria (SRB), to convert aqueous metal sulfates to metal sulfides. Micro-organisms responsible for this transformation include: species of Desulfovibrio and Desulfomonas and may be grown in an enclosed bioreactor system. These organisms oxidize simple organic compounds such as lactic acid and ethanol, to derive the energy necessary for their growth. However, more complex carbon sources can occasionally be used, e.g. phenolic compounds, or possibly organic materials leached from the soil during bioleaching. As a consequence of this oxidation, sulfates are reduced to sulfides and water. As the sulfides of many heavy metals possess low solubilities in aqueous solution, these precipitate together with some biomass as a sludge within the bioprecipitation reactor. The metal sulfides will normally be separated as sludge and may be recovered and sold for metal recovery, or in the case of toxic or radioactive metals, further immobilized in a subsequent process.

Reduction of sulfuric acid entering the bioprecipitation stage, e.g. reactor, from the metal leaching step will result in the production of hydrogen sulfide and consequent reduction in the sulfuric acid concentration. This results in the maintenance of a pH close to neutrality within the bioprecipitation stage and thus, an optimal pH for SRB activity. Additionally, the substantially neutral-pH will cause hydrogen sulfide to remain in solution, thus maintaining a redox potential sufficiently low for SRB viability, i.e. <−300 mV.

The maintenance of a suitable redox potential by this method is common. Although the procedure has previously been used to maintain a suitable reactor pH (e.g. as in EP 436254A), it has not previously been used to buffer against influent acid flows having a pH as low as pH 1.0 as might be encountered from the acid leaching step described herein.

As a result of the production of hydrogen sulfide and metal sulfides during bioprecipitation, three different product streams may arise from the bioprecipitation process:

(a) precipitated metal salts (e.g. sulfides and hydroxides) and some biomass;

(b) aqueous hydrogen sulfide, soluble metal and sulfides together with some biomass;

(c) gaseous hydrogen sulfide and carbon dioxide.

Gaseous hydrogen sulfide may be extracted by a venting means provided at or near to the top of the reactor. Aqueous hydrogen sulfide and other soluble sulfides may be separated from the sludge.

The metal sulfide sludge may be removed separately via a suitable drain in the reactor. The sludge may then be dewatered, collected and transported to another site, treated for metal recycle, or treated by a suitable encapsulation process, e.g. biologically enhanced metal fixation.

The gaseous and aqueous hydrogen sulfide extracted is a valuable source of re-usable sulfur which may be utilized by the biochemical oxidation process described hereinafter.

DETAILED DESCRIPTION OF THE INVENTION

During the initial stages of operation of the metal leaching step of the process according to the present invention, the leachate entering bioprecipitation will possess a neutral pH. Therefore, a portion of this liquor can be used to dissolve the gaseous hydrogen sulfide effluent produced from bioprecipitation.

The two aqueous hydrogen sulfide streams derived from bioprecipitation may be employed separately, or preferably combined, and oxidized within an enclosed bioreactor. The bioreactor may comprise a known system containing a consortium of naturally occurring sulfide oxidizing organisms. Examples of micro-organisms known to oxidize soluble sulfides include: *Thiobacillus thioparus, T. neapolitanus, T. denitrificans* and Thiomicrospira species. Two routes are possible for sulfide oxidation:

(a) direct oxidation to sulfuric acid and sulfates;

(b) oxidation to elemental sulfur, which can if appropriate then introduced into the contaminated soil to produce sulfuric acid.

Oxidation to elemental sulfur requires an oxygen limited environment, but possesses the advantage of providing a sulfide-free, pH neutral liquor that can be used to dissolve effluent hydrogen sulfide gas from bioprecipitation. The sulfuric acid liquor produced by direct oxidation is more versatile for use in subsequently contacting the contaminated soil.

As noted above, the process of the present invention includes one or more steps for the removal of organic contaminants from the said contaminated medium and this may be by a remediation process deployed in a similar manner to that used for the metal removal process. In general, different micro-organisms are known to degrade different species of organic compound, and appropriate microbial consortia may be selected according to the type(s) of compounds to be degraded but will generally be present within the contaminated material. The contaminated material is preferably analyzed prior to treatment to ensure an appropriate consortium is already present or added to be present. Examples of degradative strategies which may be selected are given as follows.

As a result of the interest in and research performed in the prior art to investigate the microbiological degradation of organic contaminants, several known key strategies have emerged. The strategies employed are greatly influenced by oxygen which may either function as a preferred electron acceptor, or may enzymatically be incorporated into the molecule.

Alkanes—may be degraded aerobically by micro-organisms belonging to several genera including: Pseudomonas, Nocardia, Mycobacteria, and Flavobacteria. The degradation of such compounds initially involves the introduction of oxygen into the molecule by a monooxygenase enzyme. Subsequent conversion of the resulting fatty acids to aldehydes and the carboxylic acids enables further oxidation through the beta oxidation pathway (Gottschalk, 1986).

Alkenes and alkynes—can be degraded either aerobically or anaerobically. Aerobic degradation occurs by a mechanism similar to that for alkanes. However, the more reactive nature of the double and triple bonds also permits initial degradation of the molecule under anaerobic conditions by either hydration, or epoxidation reactions. Subsequent oxidation then proceeds via beta oxidation.

Halogenated aliphatic compounds—are susceptible to both aerobic and anaerobic degradation. Generally, however, more highly halogenated compounds are more susceptible to anaerobic degradation.

Cyclic and aromatic compounds—are once again susceptible to both aerobic and anaerobic degradation. Under aerobic conditions the initial attack involves the insertion of a series of oxygen atoms into the molecule by oxygenase enzymes. Subsequent degradation occurs by either ortho or meta fission involving a further dioxygenase enzyme to achieve ring breakage. Halogenated compounds are degraded by a similar mechanism. The microorganisms involved in such degradations include: species of Alcaligenes, Pseudomonas and Corynebacteria which are able to degrade polychlorinated biphenyls (Unterman et al 1988) and Flavobacteria species which are able to degrade pentachlorophenol (Frick et al 1988).

Under anaerobic conditions substituted aromatic compounds are reduced to cyclohexanone. Ring cleavage is then achieved by hydration. Aromatic compounds with more than one chlorine atom are reductively dehalogenated prior to conversion to cyclohexanone.

Halogenated compounds—particularly those possessing more than one functional halogen group, are also subject to reductive dehalogenation. This involves the compounds acting as electron acceptors and results in chlorine atoms being eliminated from the molecule to be replaced by hydrogen atoms. Highly halogenated compounds e.g. hexachloroethane are strongly oxidized and possess greater electron affinities than molecular oxygen. As successive rounds of dehalogenation occur and electron affinities fall, the use of alternative electron acceptors such as oxygen and nitrate becomes probable, thus governing the conditions and groups of organisms that are able to effect degradation. Examples of organisms involved in reductive dechlorination include: Pseudomonas, Alcaligenes and Clostridia sp.

In contrast to metal removal, the mechanisms employed to degrade organic soil or land contaminants will be very site specific, as these will need to be tailored to the particular contaminants present within a site. However, some generalizations can be made:

1. The degradative process will be optimized to reduce and/or eliminate a range of organic compounds particularly VOCs (volatile organic compounds) and PAHs under aerobic or anaerobic conditions. These compounds will be mineralized to $CO_2$ and $H_2O$.

2. With the exception of a source of sulfate and possibly an anaerobic environment, the nutrients required to promote the growth of degradative organisms will be the same as during metal bioleaching and will be required at similar concentrations.

3. Near neutral pH conditions will be required to maximize the numbers and types of degradative organisms which can be grown.

4. Similar types of soil treatment equipment will be required for the degradation of organics, as are required during metals removal.

In some instances organic contaminants present together with metallic contaminants are desirably treated before significant acidification, or metal mobilization within the contaminated material, as this could have a deleterious effect on the micro-organisms required in the organics degradation step.

Therefore, organics may initially be degraded during operation of the process according to the present invention prior to metal leaching. Further organics degradation may occur during metal leaching. Depending on the degradative requirement of the organic contaminants, the system may be operated aerobically, anaerobically, or a combination of the two. However, anaerobic operation would delay acidification of the contaminated material. Additionally, if large amounts of organic contaminants are present it may be necessary to delay the acidification process until sufficient organic degradation has occurred. For instance, for a halogenated compound such as trichloroethylene, anaerobic conditions may be maintained to allow reductive dechlorination to vinyl chloride which may subsequently be mineralized under anaerobic conditions. Following degradation of the majority of the organics, the metal removal system may then be started. Additionally, some of the organisms employed for metal removal may be capable of degrading particular contaminants e.g. phenolic compounds may be degraded by Desulfobacteria species.

The organics treatment step when applied to soil and the like may be carried out either in-situ or ex-situ as appropriate and as determined by the requirements of the metal leaching step. In ex-situ processes a nutrient solution is contacted with the soil following excavation, over an impermeable base, the leachate solution collected and recirculated following aeration if necessary.

In-situ processes for the treatment of soil or land contaminated with organics may involve either injecting, or spraying nutrients onto the contaminated area, thus avoiding excavation. Where aeration of the nutrient solution is necessary for contaminant degradation, air may be injected into the contaminated area, or an oxidizing agent, e.g. hydrogen peroxide may be added to the nutrient solution. Leachate may be collected either in trenches, or using a system of recovery wells and recirculated.

The present invention therefore beneficially allows metal and organic contaminants to be removed from a contaminated medium using a single multistep biotreatment system. As the sulfur source may be at least partially recycled, thus allowing re-use of the process liquor, the process can conveniently be operated as a cyclical system. The present invention offers the following further advantages over prior art processes: (1) It provides a permanent solution to the contamination problem. (2) It allows the simultaneous treatment of metal and organic contaminants. (3) In-situ and ex-situ treatment systems can be available and selected as appropriate. (4) The size of the secondary waste streams and therefore the cost of dealing with them is minimized. (5) It minimizes the use of harsh chemicals which could harm the environment. (6) An opportunity to re-use certain metal contaminants is offered.

BRIEF DESCRIPTION OF THE FIGURES

While various embodiments of the present invention have been described in detail, it is apparent that modifications and adaptations of those embodiments will occur to those skilled in the art. It is to be expressly understood that such modifications and adaptations are within the scope of the present invention, as set forth in the following claims.

Embodiments of the present invention will now be described by way of example with reference to the accompanying drawings, in which:

FIG. 1 is a diagrammatic cross-sectional view of a region of land being treated in-situ by a remediation process embodying the present invention together with equipment used in the process.

As shown in FIG. 1, a region of land to be treated comprises a layer 1 of soil overlying an underground aquifer 3 below a level 2. The layer 1 incorporates a metal contaminated region 4 which has been produced by migration of contaminants from a waste sump 5 provided in the surface of the layer 1. The region 4 extends into the aquifer 3. A monitoring well 6 projects downward through the region 4 to enable measurements on the extent of contamination in the region 4 to be determined. The depth and dimensions of the contaminated region 4 have previously been determined using appropriate known analytical techniques, ground level is indicated by point 18.

Nutrients from a nutrient source 22 and, at a suitable stage in the process acid, which may be carried in a suitable carrier liquid, e.g. aerated water, are applied to the base of the empty sump 5. This application is carried out by a sprayer 7. This liquid is also applied via appropriately positioned injection wells 8 and through an infiltration gallery 9, so as to permeate through the material in the contaminated region 4. The nutrients are initially selected to promote growth of appropriate micro-organisms to provide organics degradation under substantially neutral pH conditions using one or more of the methods described above. The nutrient addition is later modified to promote soil acidification. During this secondary treatment phase, elemental sulfur may also be added to and mixed into areas of shallow contamination such as the base of the sump 5 further to promote in-situ bioleaching of metal species.

In order to enable aerobic conditions to be developed and maintained within the contaminated region 4, air is blown by an air blower 21 attached to a series of vent wells 10, (one of which is shown) either to draw air through the contaminated region 4 in the layer 1 or to inject air into the ground water in the aquifer 3 or both. Additionally, the rate of nutrient addition may be varied to avoid or create anoxic conditions within the contaminated region 4 as appropriate. The plume or region in the layer 1 and aquifer 3 supplied with nutrients and ingredients in an aqueous medium is indicated by reference 20. This plume 20 encompasses the contaminated region 4 in the layer 1 and aquifer 3.

This treatment degrades organics and subsequently also produces acid metal leaching in the region 4 in the manner described above. This may continue over weeks or months until the soil in the contaminated region 4 is substantially free of contaminating organics and metals as determined from time-to-time by suitable analysis.

The products of both organics degradation and metal leaching are collected within a portion of a ground water flow in a direction X, either naturally occurring or artificially created, and are collected by and returned to the surface above the layer 1 via a series of recovery wells 11 (one shown) using appropriate pumps (not shown). The level 2 of the aquifer 3 may be adjusted by addition of water through an infiltration gallery 24 to assist water flow in the direction X.

The collected liquor is then delivered to a selected one of three locations, viz:

(a) a buffer tank 12 for aeration and addition of appropriate nutrients before re-application to the contaminated area. This is the principal route during initial operation of the process;

(b) a bioprecipitation reactor 13;

(c) a gas liquid contactor 14 to scrub hydrogen sulfide from the gaseous effluent from bioprecipitation.

Liquor enters the reactor 13 at its base and flows upward through the reactor 13. As it does so, sulfate reducing organisms present in the reactor 13 convert the influent sulfates to sulfides in the manner described above.

The gaseous effluent produced during bioprecipitation in the reactor 13 is passed through the gas-liquid contactor 14 connected to the reactor 13. The contactor 14 permits hydrogen sulfide recovery. The gas stream leaving the contactor 14 is passed through a secondary scrubber unit 19 and discharged to atmosphere.

Bioprecipitated sludge containing insoluble sulfides is collected in the base of the reactor 13 and transferred via a pipeline 15 to a separate treatment process, e.g. biologically enhanced metal fixation, or is dewatered and collected and delivered to another site for metal recovery. The liquor obtained by dewatering the sludge may either be returned for re-use in the metal bioleaching step of the process embodying the invention, or further treated and discharged.

The effluent liquor containing dissolved sulfides arising from bioprecipitation is extracted and combined with the aqueous sulfide stream arising from the gas/liquid contactor 14. The combined aqueous sulfide stream is then pumped through a gas/liquid contactor 16 and into a sulfide oxidation reactor 17. The contactor 16 ensures that any gaseous hydrogen sulfide released by acid in the reactor 17 is re-dissolved by the alkaline influent liquor.

Within the oxidation reactor 17, the sulfide containing liquor is intimately mixed with suitable micro-organisms and oxidized to sulfate in the manner described above. The acid liquor produced is then transferred to the buffer tank or bioreactor 12 where further elemental sulfur may be added from a source 23 if required, and oxidized to sulfuric acid, by micro-organisms carried over from reactor 17 before re-addition to the contaminated material in the soil 1 in the manner described above (via the wells 8 and gallery 9 and sprayer 7). The added sulfurous material and nutrients forms a plume 20.

The metal removal treatment process is therefore cyclical and metal contaminants in the portion 3 of the soil layer 1 are, during various cycles of the metal removal process, gradually leached by the influent solution containing biochemically formed sulfuric acid and recovered as an insoluble sulfide formed in the bioprecipitation reactor 13.

A proportion of the sulfur is recovered by oxidation of sulfides in the oxidation reactor 17 and is re-used in the soil acid leaching of metal contaminants.

I claim:

1. A process for the decontamination of a medium comprising a material contaminated with one or more organic species and one or more metal species, said process comprising the steps of:

treating a body of said medium by one or more microbial agents which breaks down the organic contaminant(s) by or through the action of said one or more microbial agents, said microbial agents being provided under aerobic conditions and substantially neutral pH, followed by treating said body with microbially produced sulfuric acid, under aerobic conditions and substantially acidic pH, so as to solubilize and leach the metal species as a metal sulfate; and, treating the leached metal sulfate by a bioprecipitation process, under anaerobic conditions, which converts said sulfate to one or more insoluble metal sulfides.

2. A process as in claim 1, wherein hydrogen sulfide is produced during the bioprecipitation process, further including the step of:

separating the hydrogen sulfide from the one or more insoluble metal sulfides.

3. A process as in claim 2 including the step of:

oxidizing the hydrogen sulfide to form a re-usable source of sulfur-containing ingredient.

4. A process as in claim 1 wherein in a first stage of the process wherein organic contaminants are biodegraded by microbial agents prior to the acid treatment, the pH of the contaminated medium is maintained in a range, and wherein said range is 5 to 9.

5. A process as in claim 4 wherein said first stage is followed by a second stage comprising said acid treatment and wherein said organic contaminants are mobilized by the action of microbially produced sulfuric acid in the second stage of the process.

6. A process as in claim 1 wherein said medium comprises a particulate material selected from the group consisting of soil, rock particles, dredgings, sediments, sludges, process residues, slags and furnace dusts.

7. A process as in claim 1 wherein the metal species comprises a radioactive or toxic heavy metal species.

8. A process as in claim 6 wherein the said medium comprises soil which is treated in-situ.

9. A process as in claim 3 wherein the step of treating the leached matal sulfate is cyclical, and the re-usable source of the sulfur-containing ingredient is microbially converted to sulfuric acid for re-use in the said medium.

10. A process as in claim 9 wherein the microbial conversion to sulfuric acid is carried out in-situ in the medium being treated.

11. A process for the decontamination of a medium comprising a material contaminated with one or more organic species and one or more metal species, the process comprising the steps of:

an organic treatment stage comprising treating a body of said medium using one or more microbial agents under aerobic conditions and a substantially neutral pH, said one or more microbial agents causing degradation of one or more of said organic species to degradation products;

a subsequent leaching stage comprising treating said body with microbially produced sulfuric acid so as to solubilize and leach one or more of said metal species as a metal sulfate and mobilize one or more of said organic species and one or more of said degradation products of said organic species in a leachate, said stage being performed under aerobic conditions and acidic pH; and, a subsequent leachate treatment stage comprising treating said leachate with one or more further microbial agents so as to precipitate one or more of said metal species and to further degrade one or more of said organic species and one or more of said degradation products of one or more of said organic species, said stage being performed under anaerobic conditions.

12. A process as in claim 11 wherein alkanes, alkenes, alkynes, halogenated aliphatics, cyclic, and aromatic compounds are degraded in said organic treatment stage.

13. A process according to claim 11 in which alkenes, alkynes, halogenated aliphatics, cyclic, aromatic and halogenated compounds are degraded in said leachate treatment stage.

14. A process according to claim 11 in which the organic species are degraded due to their action as food sources for the one or more microbial species.

* * * * *